United States Patent Office 3,178,955
Patented Apr. 20, 1965

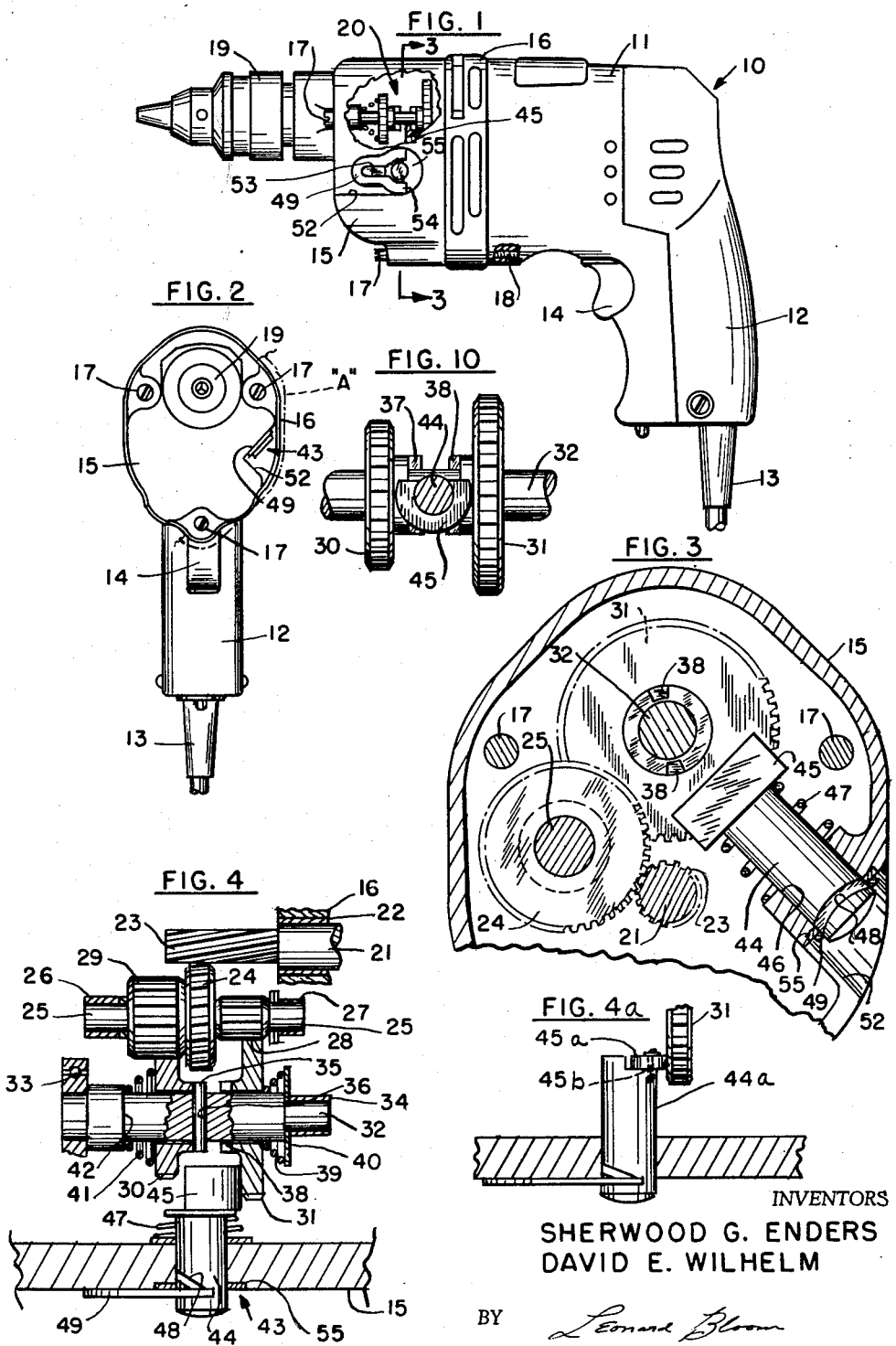

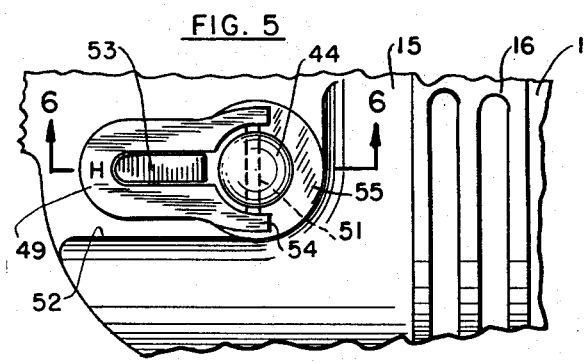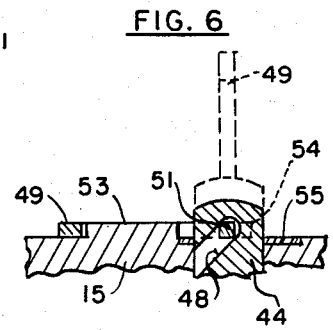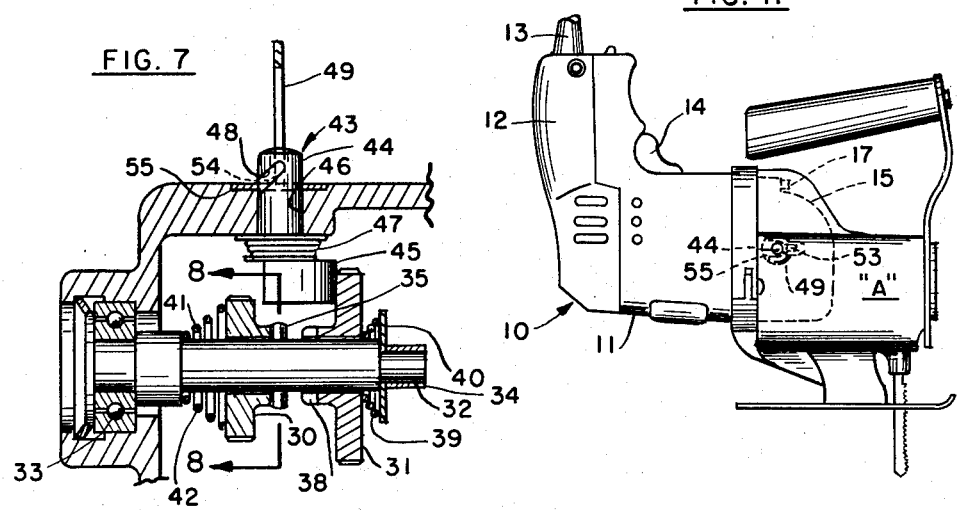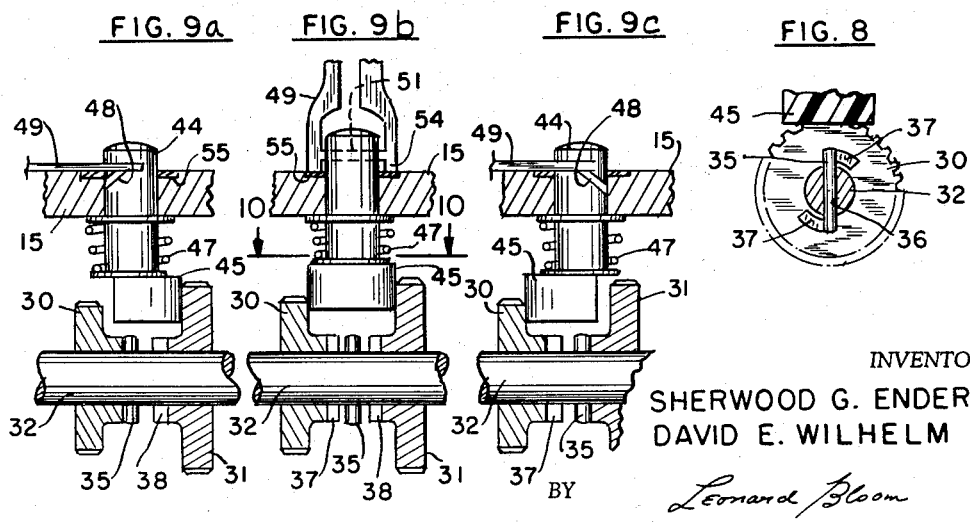

---

3,178,955
MANUALLY-MANIPULATABLE SHIFTING MEANS FOR TWO-SPEED POWER TOOL
Sherwood G. Enders, Bowley's Quarters, and David E. Wilhelm, Hampstead, Md., assignors to The Black and Decker Manufacturing Company, Towson, Md., a corporation of Maryland
Filed June 20, 1963, Ser. No. 289,323
12 Claims. (Cl. 74—369)

The present invention relates to a manually-manipulatable shifting means for a two-speed power tool, and more particularly, to a shifting means which may be used in conjunction with a two-speed portable electric drill.

The teachings of the present invention, while not confined thereto, may nevertheless find particular utility with regard to the two-speed power tool which is illustrated and described in the co-pending Stanley application S.N. 289,322, filed June 20, 1963, and assigned to the assignee of the present invention. In this latter application, a portable power-operated tool is provided with a gear case and a spindle journaled in respective bearings in the gear case. A pair of spaced-apart constantly-driven gears of different size are rotatably mounted upon the spindle and are movable along the spindle. A clutch element, such as a pin, is carried by the spindle intermediately of the gears, and cooperating clutch means are carried by each of the gears for selective engagement with the clutch element. Resilient means are provided to constantly urge each of the gears towards clutching engagement with the element; and manually-manipulatable shifting means are provided, in opposition to the resilient means, for selectively moving either one of the gears away from the clutch element, thereby allowing the other of the gears to be brought into clutching engagement with the spindle for rotation in unison.

It is an object of the present invention to provide a manually-manipulatable shifting means for use in conjunction with a two-speed transmission, either of the type illustrated and described in the aforementioned co-pending application, or of any other type suitable for use in a power-operated tool, appliance, or other device.

It is another object of the present invention to provide a shifting means having a number of salient features and advantages, which may be enumerated as follows: it is compact and does not interfere with the operator's convenient use of the tool; it avoids the use of external knobs or sliding push buttons, otherwise resorted to in the prior art, which project obtrusively from the gear case and hence interfere with the concurrent use of conventional attachments that may be secured to the gear case or to the gear case cover; it provides a positive mechanical location for both speed settings together with a visual indication of the particular speed; it may be manufactured from economical parts, which may be molded integrally or else stamped from sheet metal; it is easy to assemble in production or to disassemble for servicing; and it includes a lever that is easy to use and readily snaps back into place into an alternate position which is laterally reversed from its previous position.

It is yet another object of the present invention to provide a shifting means including a lever that is disposed flush within the confines of a substantially flat-bottomed inwardly-directed recess formed in the wall of the gear case, whereby the lever is disposed below the projected contours of the gear case above the recess formed therein, and whereby the lever does not interfere with the securing of any one of a number of conventional attachments to the drill for converting the drill to perform a number of other operations, such as sawing, jig sawing, sanding, or hedge trimming.

It is yet still another object of the present invention to provide a portable electric drill that has the advantage of a two-speed operation which is fully compatible with the use of conventional attachments that are readily available in the commercial market.

In accordance with the general teachings of the present invention, there is herein illustrated and described for use in conjunction with a power tool having a two-speed gear case, a manually-manipulatable means for shifting from one speed to another which comprises a shaft journaled in the wall of the gear case for rotary movement about its axis and also for limited longitudinal movement radially in and out of the gear case. Resilient means are provided to constantly urge the shaft inwardly of the gear case, and the inner end of the shaft carries a suitable eccentric means for shifting from one speed to another. An external lever is secured to the outer end of the shaft for pivoting movement of the lever about an axis which is transverse to the axis of the shaft and for conjoint rotary movement of the lever and shaft about the axis of the shaft. The lever is urged by the resilient means to a normal position which is flush against the gear case, and the lever prevents the complete inward withdrawal of the shaft. The free end of the lever may be lifted up from the gear case, and thereafter, the lever may be rotated, laterally reversed, and returned flush against the gear case; rotation of the lever causes a conjoint rotation of the shaft and the eccentric means into an alternate 180° position to shift from one speed to another.

These and other objects of the present invention will become apparent from a reading of the following specification, taken in conjunction with the enclosed drawings, in which:

FIGURE 1 is a side elevation of a typical two-speed power tool, showing the external lever of the shifting means in elevation, and further showing the wall of the gear case partially broken away to illustrate, in elevation, a portion of one embodiment of a two-speed transmission with which the shifting means of the present invention may find particular utility;

FIGURE 2 is a front elevation of the tool illustrated in FIGURE 1, showing the external lever in its recess below the projected contours of the gear case, and further showing (in broken lines) a portion of a typical attachment which may be secured to the two-speed power tool without interference from the shifting means of the present invention;

FIGURE 3 is a section view taken along the line 3—3 of FIGURE 1, enlarged over the scale of FIGURE 1, showing a portion of the two-speed transmission, and further showing the shifting means of the present invention in section;

FIGURE 4 is an expanded plan layout view taken along the lines 4—4 of FIGURE 3;

FIGURE 4a is a view corresponding to a portion of FIGURE 4, but showing an alternate embodiment in the eccentric means of the present invention;

FIGURE 5 is an enlarged portion of FIGURE 1, showing the lever in elevation and seated flush within its recess;

FIGURE 6 is a section view taken along the lines 6—6 of FIGURE 5, showing the means to key the lever to the gear case to prevent an inadvertent rotary movement of the lever in its normal position flush against the gear case;

FIGURE 7 is a partial plan view of the two-speed transmission, corresponding substantially to the view in FIGURE 4, but showing the lever in its raised position;

FIGURE 8 is a detail section view taken along the lines 8—8 of FIGURE 7, showing the engagement of the clutch pin with the pair of clutch teeth formed on the inner face of each of the gears;

FIGURES 9a, 9b, and 9c are sequential views showing, respectively, the "high," "neutral," and "low" speed positions of the transmission, and further showing the shifting means of the present invention in its alternate positions;

FIGURE 10 is a detail section view taken along lines 10—10 of FIGURE 9b, showing the eccentric disposed intermediately of the driven gears and taking one gear out of engagement before allowing the other gear to be engaged; and FIGURE 11 is an elevation of a typical attachment secured to the drill, showing the lever of the shifting means (in broken lines) recessed below the casing of the attachment and allowing the attachment to be secured to the drill.

With reference to FIGURES 1, 2, 3, and 4, there is illustrated a two-speed portable electric drill 10 with which the shifting means of the present invention may find more particular utility. It will be appreciated, however, by those skilled in the art that the teachings of the present invention are equally applicable to a wide variety of power-operated tools, appliances, and other devices, as well as to any number of two-speed transmissions therefor, and that the specific illustration of the two-speed portable electric drill 10 is only for convenience and clarity of understanding and does not thereby limit the scope of the invention. With this in mind, the two-speed drill 10 comprises a motor housing 11, a pendant handle 12, and electrical cord 13, a trigger switch 14, a gear case 15 and a gear case cover 16 secured forwardly of the motor housing 11 by means of a plurality of screws 17 which are received within respective threaded recesses 18 formed in the motor housing 11, a conventional chuck 19, and a two-speed transmission 20, the latter being described and claimed in the aforementioned co-pending application. The motor housing 11 includes a motor (not shown) which has an armature shaft 21 journaled in a bearing 22 in the gear case cover 16. The armature shaft 21 projects within the gear case 15, and a suitable pinion 23 is formed thereon. The pinion 23 engages (or meshes) with an intermediate gear 24 carried by the intermediate shaft 25 which is journaled in bearings 26 and 27 in the gear case 15 and gear case cover 16, respectively. A pair of spaced-apart gears 28 and 29 of different size are carried on the intermediate shaft 25, one on each side of the intermediate gear 24. The gears 28 and 29 are constantly in mesh with a pair of spaced-apart driven gears 30 and 31, respectively, of different size, which are rotatably mounted on an output spindle 32, and which are movable axially along the spindle. The spindle 32 is journaled in bearings 33 and 34 retained in the gear case 15 and gear case cover 16, respectively, and the chuck 19 (or other tool holder) is secured to the spindle 32 in a conventional manner. The respective axes of the armature shaft 21, intermediate shaft 25, and spindle 32, see FIGURE 3, are all parallel to each other, but are radially offset one from another.

With reference again to FIGURES 3 and 4, and with further reference to FIGURE 8, a clutch element, preferably comprising a pin 35, is press-fitted within a transverse bore 36 formed in the spindle 32 intermediately of the rotatably-mounted gears 30 and 31. The clutch pin 35 has respective end portions which extend radially of the spindle 32 and are adapted to engage cooperating clutch means carried by each of the gears 30, 31, thereby coupling a selected one of the gears 30, 31 to the spindle 32 for rotation in unison. Preferably, the cooperating clutch means, see FIGURE 8, comprises respective pairs 37, 38 of diametrically-opposed clutch teeth formed on the inner faces of the gears 30 and 31. A coil spring 39 (or other resilient means) is seated against a washer 40 that is disposed against the front face of the gear case cover 16, and the spring 39 bears against the outer face of the gear 31 and thus constantly urges the gear 31 forwardly into clutching engagement with the pin 35. Similarly, a coil spring 41 (or other resilient means) is seated against an annular shoulder 42 formed on the spindle 32, and the spring 41 bears against the outer face of the other gear 30 and thus constantly urges the gear 30 rearwardly into clutching engagement with the pin 35. Consequently, means are provided to constantly urge each of the gears 30 and 31 into clutching engagement with the pin 33; and the shifting means of the present invention are provided, in opposition to and counteracting the resilient means, to move one or the other of the gears 30, 31 away from engagement with the pin 33, thereby allowing a "desired" one of the gears, under the influence of its respective spring, to automatically engage the pin 35 for coupling that desired gear to the spindle 32 for rotation in unison. While the shifting means of the present invention has been illustrated with the type of two-speed transmission described above, nevertheless, it will be appreciated from the following description that the teachings of the present invention are equally applicable to any type of multiple-speed transmission, as for example, that which is illustrated and described in the now-expired Kollock Patent 1,581,927, wherein a two-speed electric drill is provided with a sliding gear cluster that is actuated by means of a rotatable eccentric shaft having an external knob.

With reference again to FIGURES 1, 2, 3, and 4, and with further reference to FIGURES 5, 6, and 7, there is illustrated the manually-manipulatable shifting means 43 of the present invention. The shifting means 43 comprises a shaft 44 (or other shiftable member) which preferably is molded from a suitable anti-friction type of material, such as nylon or a derivative thereof; and the shaft 44 carries a suitable eccentric means, such as the integrally-formed eccentric 45, on the inner end thereof. The shaft 44 is journaled in a bore 46 formed in the wall of the gear case 15 for rotary movement about its axis and also for limited longitudinal movement radially in and out of the gear case 15. A coil spring 47 (or other resilient means) is retained between the eccentric 45 and the wall of the gear case 15 so as to constantly urge the shaft 44 inwardly of the gear case 15. The outer end of the shaft has a slot 48 formed therein; the slot 48 is in the nature of a cam slot, that is, it is angularly skewed with respect to the axis of the shaft 44, with their respective axes diverging away from each other in a direction inwardly of the gear case 15. A substantially-flat external lever 49 (or other shift member) has an opening 50 and further has an integral bridge portion 51 which closes off the opening 50. The bridge portion 51 of the lever 49 is received within the slot 48 formed in the shaft 44 and bottoms in the slot, and hence the lever 49 is secured to the shaft 44 for pivoting movement of the lever 49 about an axis which is transverse to the axis of the shaft 44, and also, for conjoint rotary movement of the lever and shaft about the axis of the shaft. Preferably, the lever 49 is received within a substantially flat-bottomed inwardly-directed recess 52 formed in the adjacent wall of the gear case 15; the lever 49 is urged by the spring 47 to a normal position which is flush against the bottom of the recess, and the lever 49 prevents the complete inward withdrawal of the shaft 44.

With particular reference to FIGURES 2 and 11, the lever 49, in its normal position, does not extend radially beyond the projected contours of the gear case 15 above the recess 52, and hence the shifting means 43 of the present invention does not interfere with the securing of any conventional attachments to the drill 10, and more particularly, to the gear case 15 and gear case cover 16 thereof. In FIGURE 11, there is illustrated a conventional jig saw attachment A for an electric drill, the jig saw attachment A being of the type which is illustrated and described more particularly in the Lee et al. Patent 2,822,005 issued on February 4, 1958, and assigned to the assignee of the present invention. Other attachments (not shown herein) that may be used equally as well with the present invention, would include a circular saw attachment, such as is illustrated and described in the Wilhide Patent 2,790,468 issued on April 30, 1957, and assigned to the assignee of the present invention, and also, a hedge trimmer attachment, such as is illustrated and described in the Lee Patent 2,882,596 issued on April 21, 1959, and assigned to the assignee of the present invention. Consequently, the portable electric drill 10 has the desirable advantage of two-speed operation, yet this advantage is realized and is fully compatible with the use of conventional attachments for converting the drill to perform a number of different operations, such as sawing, jig sawing, sanding, or hedge trimming. Moreover, for each of the various attachments that may be secured to the drill, the shifting means of the present invention may first be adjusted to its "low" or "high" speed setting; and thus each of the attachments is provided with a "two-speed" operation, which is a distinct advantage over the prior art.

With particular reference to FIGURES 5 and 6, the recess 52 is provided with a raised portion 53 which is received within the opening 50 in the lever 49, so as to key the lever 49 to the gear case 15 and prevent inadvertent shifting of the lever 49 in its normal flush position within the recess 52. The lever 49 is further provided with a pair of tabs 54, one on each side of the bridge portion 51 and extending therefrom, and a wear washer 55 is retained within the recess 52 for engagement with the tabs 54. Consequently, when the free end of the lever 49 is raised up and away from the gear case 15, the tabs 54 pivot on the surface of the wear washer 55, and the shaft 44 is withdrawn slightly from the gear case 15; and thereafter, when the lever 49 has been raised sufficiently to clear the adjacent walls or confines of the recess 52, the lever 49 may be rotated about the axis of the shaft 44, laterally reversed, and returned to an alternate position which is again flush against the bottom of the recess 52. Rotation of the lever 49 results in a conjoint rotation of the shaft 44 and eccentric 45 to an alternate 180° position. The eccentric 45 is disposed intermediately of the gears 30 and 31 and radially of the clutch pin 35, see FIGURES 4 and 10, and is adapted to bear against one or the other of the gears 30, 31 to push the "undesired" gear out of the way, thereby allowing the other of the gears, under the impetus of its respective spring, to be coupled automatically to the spindle 32 through the cooperating clutch means.

Operation

With reference to FIGURES 9a, 9b, and 9c, the inherent utility and operation of the shifting means of the present invention may be more clearly understood. In FIGURE 9a, the two-speed transmission 20 has been adjusted so that the clutch teeth 37 of the gear 30 are in engagement with the pin 35, such that the gear 30 is coupled to the spindle 32, and such that the eccentric 45 has engaged the respective inner face of the other (and larger) gear 31 so as to move gear 31 away from clutching engagement with the pin 33. This is the "high" speed position of the transmission 20. Then, in FIGURE 9b, the free end of the shift lever 49 has been lifted up and away from the surface of the gear case 15 so as to clear the adjacent walls of the recess 52 (the shaft 44 being withdrawn radially out of the gear case 15 by a slight amount against the force of its spring 47) and thereafter, the lever 49 and the shaft 44 may be rotated conjointly about the axis of the shaft 44 so as to move the eccentric 45 towards its alternate 180° position. In FIGURE 9b, the eccentric 45 has now engaged the inner face of gear 30, yet is still in engagement with the respective inner face of the gear 31, see FIGURE 10, so that both gears are out of clutching engagement with the spindle 32. This corresponds to a "neutral" position, that is, it is not possible to bring one gear into clutching engagement with the spindle 32 until the other gear has been fully disengaged. Thus the transmission 20 of the aforementioned co-pending Stanley application may be shifted from one speed to another during the operation of the drill without the necessity for removing the drill from the work, or without the necessity for completely shutting down the drill; yet this is accomplished without any clashing of gear teeth which would otherwise detract from the use and serviceability of the tool. Then, in FIGURE 9c, and in the manner previously explained, the lever 49 has been moved into its alternate laterally-reversed position, and the shaft 44 and eccentric 45 have been moved into their alternate 180° position; and the gear 30, which is now the "undesired" gear, has been moved by the eccentric 45 out of clutching engagement with the spindle 32. Hence the other or "desired" gear 31, under the constant influence of its spring 41, is automatically brought into clutching engagement with the spindle 32 through the cooperating means of the pin 35 and the clutch teeth 38; and this corresponds to the "low" speed position of the transmission 20. One side of the lever 49 has the letter "H" thereon to indicate the "high" speed setting, while the opposite side of the lever 49 has the letter "L" thereon to indicate the "low" speed setting.

With reference to FIGURE 4a, there is illustrated a modification to a portion of the shifting means 43, wherein the shaft 44a is machined from a suitable metal, and wherein the eccentric means comprises a roller 45a which is secured to the end of the shaft by means of a screw 45b. The operation, however, is identical to that which has been previously explained.

Obviously, many modifications may be made without departing from the basic spirit of the present invention; and accordingly, within the scope of the appended claims, the invention may be practiced other than has been specifically described herein.

We claim:
1. In a power-operated device having a two-speed gear case, manually-manipulatable means for shifting from one speed to another, comprising:
   (a) a shaft journaled in the wall of the gear case for rotary movement about its axis and also for limited longitudinal movement radially in and out of the gear case;
   (b) resilient means constantly urging said shaft inwardly of the gear case;
   (c) eccentric means carried on the inner end of said shaft;
   (d) an external lever; and
   (e) means to secure said lever to the outer end of said shaft for pivoting movement of said lever about an axis which is transverse to the axis of said shaft and for conjoint rotary movement of said lever and shaft about the axis of said shaft, whereby said lever is urged by said resilient means to a normal position flush against the gear case, said lever preventing the complete inward withdrawal of said shaft, and whereby the free end of said lever may be lifted up from the gear case and thereafter said lever may be rotated, laterally reversed, and returned flush against the gear case, thereby rotating said shaft and said eccentric means into an alternate 180° position to shift from one speed to another.

2. The combination of claim 1, wherein:
   (a) keying means are provided between said lever and the gear case to preevnt inadvertent rotary movement of said lever in its normal flush position with respect to said gear case.

3. The combination of claim 1, wherein:
   (a) said shaft is molded from an anti-friction type of material, and wherein:
   (b) said eccentric means is formed integrally with said shaft on an axis parallel to, an radially offset from, the axis of said shaft.

4. The combination of claim 1, wherein:
 (a) said eccentric means comprises a roller carried by said shaft on axis parallel to, and radially offset from, the axis of said shaft.

5. The combination of claim 1, wherein:
 (a) said resilient means comprises a coil spring wound around said shaft and disposed between said eccentric means and the wall of the gear case.

6. The combination of claim 1, wherein:
 (a) said lever comprises a substantially-flat piece; and wherein:
 (b) the gear case has an externally-accessible substantially flat-bottomed recess to receive said lever, whereby said lever is recessed below the projected contours of the gear case above said recess formed therein.

7. The combination of claim 1, wherein:
 (a) said shaft has a slot formed therein near the outer end thereon;
 (b) said slot being formed on an axis transverse to the axis of said shaft, with their respective axes diverging away from each other in a direction inwardly of the gear case; and wherein:
 (c) said lever comprises a substantially-flat piece having an opening formed therein and further having an integral bridge portion closing off said opening, whereby said bridge portion of said lever is received in said slot formed in said shaft and bottoms within said slot.

8. The combination of claim 7, wherein:
 (a) a pair of tabs are formed integrally with said lever, one on each side of said integral bridge portion and each extending therefrom, whereby said tabs engage the outer surface of the gear case and pivot on the gear case as the end of said lever is lifted up in shifting from one speed to another.

9. The combination of claim 8, wherein:
 (a) a hardened wear washer is disposed between said tabs and the outer surface of the gear case.

10. In a power-operated device having a gear case in which shiftable elements of a two-speed transmission are housed, manually-manipulatable means carried by the case for shifting from one speed to another, comprising:
 (a) a shaft journaled in the wall of the gear case for rotary movement about its axis and also for limited longitudinal movement radially in and out of the gear case;
 (b) means constantly urging said shaft inwardly of the gear case;
 (c) means formed on the inner end of said shaft for engaging the shiftable elements to shift from one speed to another;
 (d) said shaft having a slot formed therein near the outer end thereof;
 (e) said slot being formed on an axis transverse to the axis of said shaft, with their respective axes diverging away from each other in a direction inwardly of the gear case;
 (f) a substantially-flat external lever having an opening formed therein and further having an integral bridge portion closing off said opening;
 (g) said bridge portion of said lever being received within said slot in said shaft and bottoming within said slot, whereby said lever is urged to a normal position which is flush against the gear case, and whereby said lever prevents the complete inward withdrawal of said shaft; and
 (h) a pair of tabs formed integrally with said lever, one on each side of said bridge portion and each extending therefrom, whereby the free end of said lever may be lifted up from the gear case, with said tabs engaging the outer surface of the gear case and pivoting on the gear case, and thereafter said lever may be rotated about the axis of said shaft, laterally reversed, and returned flush against the gear case, thereby rotating said shaft into an alternate 180° position to shift from one speed to another.

11. In a two-speed portable electric drill to which an attachment may be secured for converting the drill to perform a different operation, the combination of:
 (a) a housing including a gear case to which the attachment may be secured;
 (b) an externally-accessible substantially flat-bottomed recess formed in the wall of said gear case, said recess being directed radially inwardly of said gear case;
 (c) a multi-speed transmission in said gear case; and
 (d) manually-manipulatable shifting means for said transmission, said means including a substantially-flat external lever disposed substantially flush within said recess and a shaft connected to said lever and having an end portion projecting slightly in a radial direction beyond said recess, said end portion of said shaft and said lever being disposed below the projected contours of the gear case above said recess, whereby said lever and said shaft do not interfere with the securing of the attachment to the drill.

12. In a power-operated device having a gear case in which shiftable elements of a multi-speed transmission are housed, manually-manipulatable means carried by the case for shifting from one speed to another, said means comprising:
 (a) a shaft journaled in a wall of the case for rotary movement about its axis, said shaft having a portion projecting radially of the case;
 (b) a lever external to the wall of the case;
 (c) means coupling said lever to said projecting portion of said shaft for pivoting movement of said lever about an axis which is transverse to the axis of said shaft and for conjoint rotary movement of said lever and shaft about the axis of said shaft;
 (d) keying means between said lever and the wall of the case to prevent an inadvertent rotary movement of said lever about the axis of said shaft while the power-operated device is running;
 (e) means constantly urging said lever into its normal position with said keying means; and
 (f) means carried by said shaft within the gear case for engaging the shiftable elements to shift the transmission from one speed to another;
 (g) whereby the free end of said lever may be lifted up and away from the wall of the gear case to clear said keying means, and whereby said lever and said shaft may be rotated conjointly to shift the transmission to a different speed, and thereafter, said lever may be laterally reversed and returned to its keyed position with the wall of the gear case.

References Cited by the Examiner
UNITED STATES PATENTS

| | | |
|---|---|---|
| 1,217,540 | 2/17 | Wappat. |
| 2,486,254 | 10/49 | Briskin et al. |
| 2,663,200 | 12/53 | Godillon. |
| 2,911,841 | 11/59 | Miller _____ 74—342 |

DON A. WAITE, *Primary Examiner.*